United States Patent [19]
Farmont

[11] Patent Number: 5,504,314
[45] Date of Patent: Apr. 2, 1996

[54] MONITORING AND/OR DIRECTING SYSTEM FOR PARKING AREAS

[76] Inventor: Johann Farmont, Talstrasse 1, 40217 Dusseldorf, Germany

[21] Appl. No.: 309,093

[22] Filed: Sep. 20, 1994

Related U.S. Application Data

[63] Continuation-in-part of Ser. No. 84,545, Jun. 29, 1993, abandoned.

[30] Foreign Application Priority Data

Apr. 23, 1994 [DE] Germany ................. 44 14 297.8

[51] Int. Cl.⁶ ................................. G07B 15/02
[52] U.S. Cl. ................. 235/384; 340/932.2; 194/902
[58] Field of Search ................... 235/384; 340/932.2; 194/902

[56] References Cited

U.S. PATENT DOCUMENTS

| | | |
|---|---|---|
| 2,063,356 | 12/1936 | Wiggins . |
| 3,397,764 | 8/1968 | Simjian . |
| 3,766,452 | 10/1973 | Eglise et al. . |
| 4,101,701 | 7/1978 | Gordon . |
| 4,257,436 | 3/1981 | Smith . |
| 4,319,674 | 3/1982 | Riggs . |
| 4,380,699 | 4/1983 | Monnier . |
| 4,395,043 | 7/1983 | Gargione . |
| 4,585,930 | 4/1986 | Cusden . |
| 4,674,618 | 6/1987 | Eglise et al. . |
| 4,703,164 | 10/1987 | Von Ballmoos ............. 235/384 |
| 4,717,815 | 1/1988 | Tomer ..................... 235/384 |
| 4,788,102 | 11/1988 | Koning et al. . |
| 4,865,222 | 9/1989 | Sullivan . |
| 4,868,373 | 9/1989 | Opheij . |
| 4,926,996 | 5/1990 | Eglise . |
| 4,960,983 | 10/1990 | Inoue . |
| 4,969,549 | 11/1990 | Eglise . |
| 4,982,070 | 1/1991 | Bezin . |
| 4,990,759 | 2/1991 | Gloton . |
| 5,091,727 | 2/1992 | Mahmood ............. 340/932.2 |
| 5,206,495 | 4/1993 | Kreft . |
| 5,208,110 | 5/1993 | Smith et al. . |

FOREIGN PATENT DOCUMENTS

| | | |
|---|---|---|
| 391375 | 9/1990 | Austria . |
| 0354829 | 2/1990 | European Pat. Off. . |
| 402821 | 12/1990 | European Pat. Off. . |
| 2625351 | 6/1987 | France . |
| 2231720 | 1/1973 | Germany . |
| 2557984 | 6/1977 | Germany . |
| 2628595 | 1/1978 | Germany . |
| 2926867 | 1/1981 | Germany . |
| 3307986 | 9/1983 | Germany . |
| 3339387 | 5/1984 | Germany . |
| 3608165 | 9/1986 | Germany . |
| 3830643 | 3/1989 | Germany . |
| 4021770 | 1/1992 | Germany . |
| 60/215288 | 10/1985 | Japan . |
| 2-181899 | 7/1990 | Japan ............. 340/932.2 |
| 3-93000 | 4/1991 | Japan ............. 340/932.2 |
| 4-60480 | 2/1992 | Japan ............. 340/932.2 |
| 4004495 | 8/1992 | Japan . |
| 5189626 | 7/1993 | Japan ............. 235/487 |
| 654942 | 3/1982 | Switzerland . |
| 124 | of 1854 | United Kingdom . |
| 2208024 | 2/1989 | United Kingdom . |
| WO89/05498 | 6/1989 | WIPO . |
| 89/12286 | 12/1989 | WIPO . |
| 91/14237 | 9/1991 | WIPO . |
| WO93/20539 | 10/1993 | WIPO ............. 340/932.2 |

Primary Examiner—F. L. Evans
Attorney, Agent, or Firm—Steven F. Caserza; Flehr, Hohbach, Test, Albritton & Herbert

[57] ABSTRACT

The invention relates to a monitoring and/or directing system for parking areas which exhibit parking spaces. In order that the risk of theft is reduced and/if appropriate, incoming vehicles can be guided specifically to empty parking spaces, the monitoring and/or directing system is designed with at least one entrance and departure station provided for issue and retrieval of parking tickets fitted with an electronic identification element, with communicators which detect the parking tickets, there being arranged, at each parking space, at least one communicator which has a detection region directed towards the associated parking space, and with data lines via which the communicators and the entrance and departure stations are connected to a central computer.

10 Claims, 2 Drawing Sheets

MONITORING AND/OR DIRECTING SYSTEM FOR PARKING AREAS

This application is a Continuation-in-Part of application Ser. No. 08/084,545 filed Jun. 29, 1993, now abandoned.

BACKGROUND OF THE INVENTION

1. Field of the Invention

The invention relates to a monitoring and/or directing system for parking areas which exhibits the availability of parking spaces for parking vehicles for a period of time.

2. Description of the Prior Art

One of the disadvantages with parking areas is the risk of theft to the parked vehicles, this risk being promoted both by the given parking-area surroundings and by the uncontrolled departure of the vehicles.

Moreover, parking areas, in particular during very busy periods, are very much subject to the adverse effects of vehicles which drive around in the search for an empty parking space. Such traffic on the lookout for spaces not only obstructs the incoming and outgoing vehicles, but also results in undesired exhaust-gas contamination and a waste of fuel.

The object of the invention is thus to provide a monitoring and/or directing system for parking areas which reduces the risk of theft and enables incoming vehicles to be guided specifically to empty parking spaces.

SUMMARY OF THE INVENTION

The invention provides a monitoring and/or directing system which assigns to all the parking spaces in a multi-story car park or an open-air car park a parking-space identifier in the form of a communicator which detects a stored identification number in the parking ticket, which has been drawn out by the car-park user on entrance into the car park, at least when the car-park user passes unavoidably into a response region of the communicator of a parking space, i.e., when the user parks a vehicle in a parking space and collects it therefrom.

Via a connected data-processing system, the information determined in a parking-space-specific manner by a communicator in each case can be evaluated and used in order to actuate monitoring and/or directing devices, in particular entrance-control and/or departure-control devices and/or alarm devices.

For contactless identification of the parking tickets, the communicators each preferably comprise a read head which contains an aerial which responds in each case to a transmitting device or transmitting/receiving device which can be integrated in the parking tickets. In this arrangement, the parking tickets can transmit their respective identification number or identification to the communicator actively or passively, i.e., without a battery. Furthermore, the read head of each communicator can be combined with a write head, as a result of which the communicators can also record on the parking tickets.

In this manner, the identification number of a parking ticket, which has been received by the car-park user upon entrance into the car park, can be detected and stored in a parking-space-specific manner upon parking of the vehicle. The parking ticket, which has been taken by the car-park user and authorizes him/her to depart, can likewise be detected upon collection of the vehicle. By a comparison of the stored identification number and that which is read at this point in time, a check can be carried out and, for example when the numbers do not correspond, the departure of the collected car can be blocked. Removal of the vehicles from the parking spaces is consequently monitored by the parking tickets which have been taken by the car-park users.

The communicators can be connected to the central computer via an evaluation unit. By means of the evaluation unit, which communicates with the communicators on the input side and with the central computer on the output side, the information can be prepared and the data transmission controlled.

The monitoring and/or directing system may, furthermore, comprise at least one alarm indicator which can be activated in dependence on the identification numbers read by the communicators.

The communicators are preferably arranged at the parking spaces such that their response region covers the parking space. For this purpose, the communicators are preferably installed in the ceiling region.

At least one communicator may also be installed at the departure station in order to check those vehicles which have been collected from a parking space without a parking ticket which authorizes their departure, as may be the case, for example, if the parking tickets have been taken by passengers waiting at the exit.

The identification numbers read by the communicators can be used to update a parking-area occupancy plan, which is to be compiled by the central computer, in order, within the context of a directing system, to fill up the free parking spaces in the intended manner. A check on the free and occupied state of the parking spaces is possible by means of sensors provided at each parking space. The respective state of occupancy can be indicated via visible signal devices which can be linked to the communicators.

Communication of the entrance and departure stations with the central computer via data lines permits full recording of the data necessary for a parking procedure, in conjunction with the monitoring and/or directing system according to the invention.

Further embodiments of the invention can be gathered from the following description and drawing figures.

DETAILED DESCRIPTION OF A PREFERRED EMBODIMENT

Figure 1:
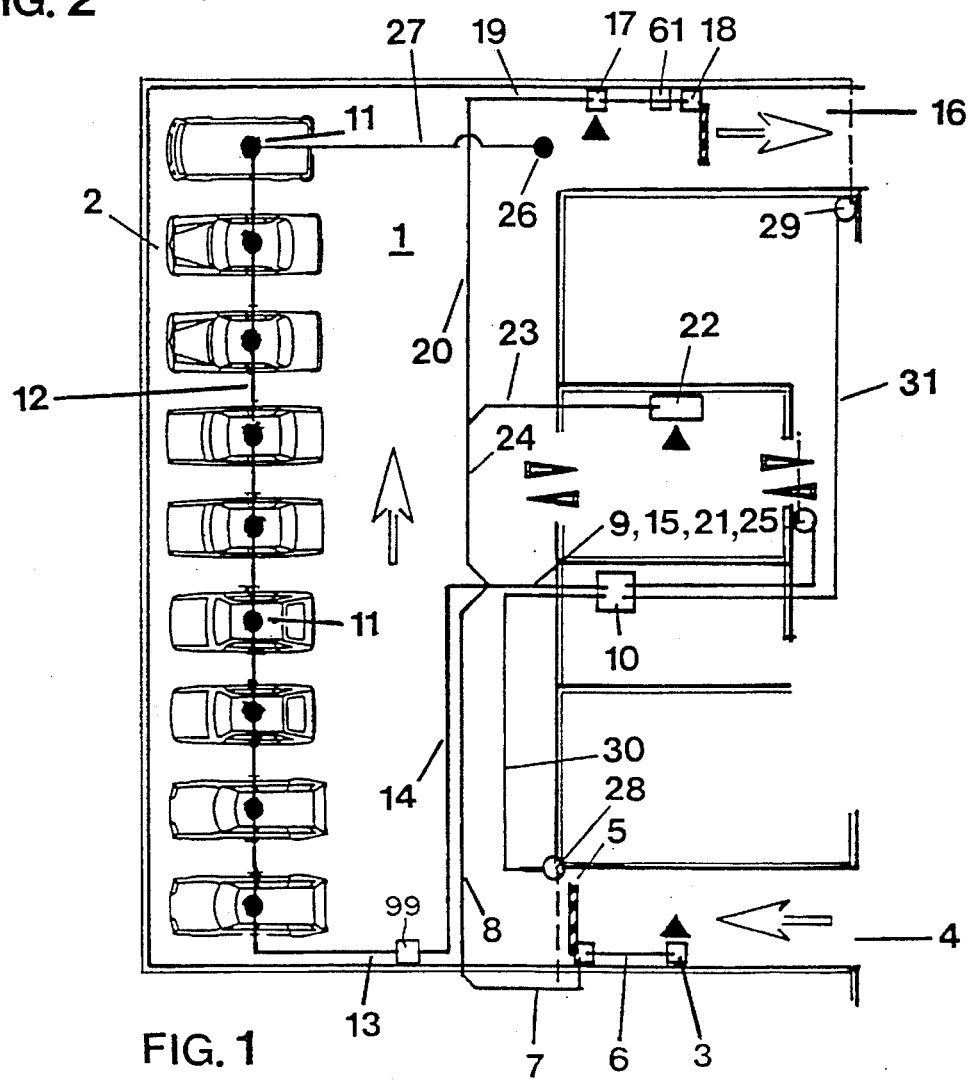
FIG. 1 shows, schematically, a plan view of a monitoring and/or directing system.

FIG. 1 shows a monitoring and/or directing system for parking areas 1 having a plurality of parking spaces 2 which can be distributed on one or more stories of a multi-story car park or an open-air car park.

Figure 3:
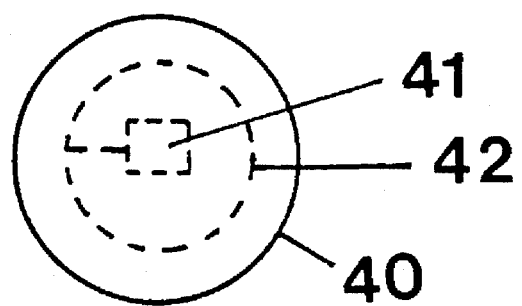
FIG. 3 shows, schematically a front view of a parking ticket.

The monitoring and/or directing system comprises an entrance station 3 in the entrance region 4 of the parking area 1. The entrance station 3 serves to issue parking tickets 40 (see FIG. 3) when a car-park user enters the parking area 1 with his/her vehicle. The parking tickets 40 which can be issued are each fitted with an electronic identification element 41, by means of which each parking ticket 40 can be assigned an individual identification number or identification. In order that the respective identification number can be read in a contactless manner, the electronic identification element 41 of the parking tickets 40 comprises a transmitting device 42 for transmitting the individual identification. Provided that the parking tickets 40 can also be recorded on by the entrance station 3, the electronic identification element comprises a transmitting/receiving device.

The parking ticket 40, which is to be issued by the entrance station 3 to a car-park user, is first of all read and/or recorded on in said entrance station 3 and is then dispensed to an incoming car-park user. Dispensing or removal of a parking ticket 40 causes an entrance barrier 5, which is arranged adjacent to the entrance station 3, to be opened.

The data, in particular the entrance time and the entrance-station number which are necessary for the cost-accounting of a parking procedure, can be recorded directly onto the parking ticket 40 before it is issued from the entrance station 3. The parking ticket 40 is then a data carrier which can be recorded on individually.

Alternatively, the entrance station 3 may only read the identification (e.g., a card code) of a parking ticket 40 in each case and pass it on to a central computer 10 via data lines 6, 7, 8 and 9 which connect the entrance station 3 to said central computer 10. The central computer 10 stores the identification, which has been read by the entrance station 3 upon issuing of a parking ticket 40, together with respective parking data, in particular entrance time and entrance-station number. These items of parking data are necessary for calculating the parking charges.

The data lines 6, 7, 8 and 9 may also be used for communication between entrance station 3 and central computer 10. This applies, in particular, if the central computer 10 compiles an occupancy plan for the parking spaces 2, with the result that, upon issuing of a parking ticket 40, the entrance station 3 is also able to indicate a specific free parking space 2 to the car-park user.

Figure 2:
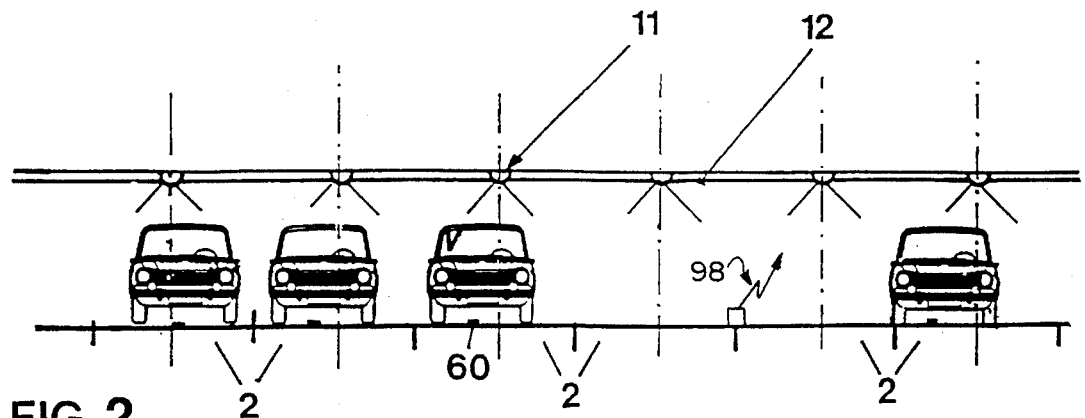
FIG. 2 shows, schematically a front view of part of a row of parking spaces.
Figure 4:
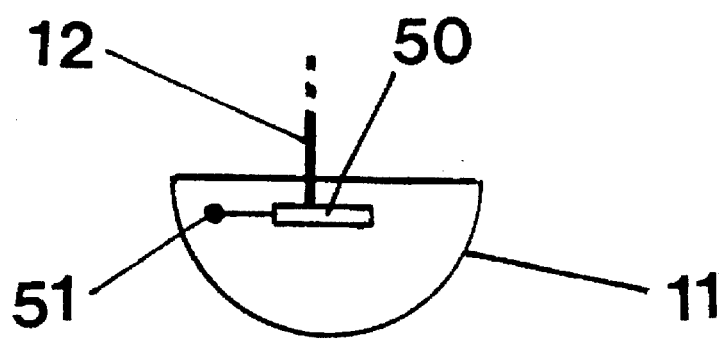
FIG. 4 shows, schematically, a cross-section of a communicator.

As can be seen in FIGS. 1, 2 and 4, each parking space 2 is assigned a communicator 11. The communicators 11 are parking-space identifiers which comprise a read head 50 with an antenna 51 for contactless reading of the identification numbers in the parking tickets 40. In this arrangement, the communicators 11 are installed such that the response region of their respective antenna covers the associated parking space. For this purpose, the communicators 11 are preferably installed above the respective parking space 2 on the ceiling, in particular in the central region. In addition, the antennas are tuned to the transmitting signals of the parking tickets 40 for transmission of their respective identification number. In order that the communicators 11 can read the identification numbers of the parking tickets 40 in their near region, the parking tickets 40 may operate actively i.e., transmit signals while being powered by a battery. Alternatively, the parking tickets may also operate passively, i.e., without a battery, by the communicators 11 ensuring inductive energy transmission.

All the communicators 11 are connected to a data line 12 which is connected to the central computer 10 via data-line branches 13, 14 and 15. The communicators 11 are preferably connected to the central computer 10 via an evaluation device (not shown).

Furthermore, there may be arranged in addition to the communicators 11, at each parking space 2, a parking-space sensor 60 which is likewise connected to the data line 12 and detects whether the parking space 2 is free or occupied. Examples of means which can be used as sensor 60 are an infrared barrier, an ultrasonic sensor or an inductive measuring system. In addition, said parking-space sensor 60 may be combined with a visual display device, e.g., a red/green signal, for example as depicted by visual signal 98 of FIG. 2.

In the departure region 16, the monitoring and/or directing system comprises a departure station 17 with associated departure barrier 18. The departure station 17 is connected to the central computer 10 via data lines 19, 20 and 21.

Furthermore, there is also provided a paying station 22 which is connected to the central computer 10 via data lines 23, 24, 25.

The functioning of the monitoring and/or directing system is described hereinbelow. A car-park user receives a parking ticket 40 at the entrance station 3. The identification of the parking ticket 40 is read by the entrance station 3 and sent, via the data lines 6, 7, 8 and 9 to the central computer 10 which adds date, time and entrance-station number, provided that these items of parking data are not recorded directly onto the parking ticket 40. The car-park user then drives the vehicle (and the parking ticket 40) to an empty parking space 2 and parks there. The communicator 11 installed at the parking space 2 in which the car-park user has parked detects the identification number of the parking ticket 40, which the car-park user takes with him/her, and transmits said information, together with its parking-space number, to the central computer 10, if appropriate via the evaluation device (such as evaluation device 99 of FIG. 1) which stores said data. Simultaneously, the parking-space sensor 60 can indicate the "occupied" state of the parking space 2 to the central computer 10 and the display device can be set to red.

When the car-park user comes back to collect his/her vehicle, the communicator 11 detects the identification number of the parking ticket which was taken and transmits said information to the central computer 10 again. There, a comparison with the identification number which has been stored for the parking space 2 is carried out. When the identification numbers correspond, the car-park user can remove the vehicle unhindered. If the numbers do not correspond, an alarm device 61 which can be activated by the central computer 10, or another device, which blocks the exit, can be actuated. Simultaneously, the parking-space sensor 60 can indicate the "free" state of the parking space 2 to the central computer 10 and the display device can be set to green.

A vehicle can thus only be removed unobstructed from a parking space if the identification numbers of the parking ticket 40 which has been used upon entrance to the car park corresponds to the identification number on the parking ticket taken along upon collection of the vehicle.

For the case where a vehicle is collected without a parking ticket 40 being taken along, there is provided, in front of the departure station 17, an additional communicator 26 which is connected to the data line 12 via a data line 27. By means of said communicator 26, a comparison of the identification numbers of the parking tickets 40 can be subsequently carried out if an indication is made, by means of the parking-space sensor 60, as to which parking space 2 the vehicle has been removed from, without a comparison of the parking-ticket identification numbers.

Via the identification numbers, the items of information delivered by the communicators 11 to the central computer 10 upon parking a vehicle in a parking space 2, or collecting it therefrom, may be used at the same time as information for the "occupied" or "free" state of the respective parking space 2. The central computer 10 can process these items of information within the context of an occupancy plan. These items of information can be checked or monitored via the parking-space sensors 60.

Free parking spaces 2 are thus always detected and can be indicated to the car-park users upon entrance into the car park since the entrance station 3 communicates with the central computer 10. Such a directing system ensures that traffic driving around the car park on the lookout for spaces is eliminated.

A check on authorization for departure in terms of payment of the parking charges at the paying station 22 takes place in the known manner.

Rolling shutter doors 28 and 29 at the entrance 4 and the exit 16 may be provided for closing the parking area 1, e.g., during the night. In order to actuate these rolling shutter doors 28, 29, they may be connected to the central computer 10 via lines 30, 31.

As a modification to the above-described exemplary embodiment, the communicators 11 may be installed at the parking spaces 2 such that, upon parking, the car-park user has to bring the parking ticket 40, which he/she has taken, into the response region of the communicator 11 in a specific manner, e.g., pass through a slot in 11, in order thus to activate the above-described monitoring. Upon collection of the vehicle, the car-park user must once again bring the parking ticket 40 into the response region of the communicator 11 in a specific manner in order to carry out control checks in the context of the monitoring. This results in the monitoring system only being activated when a car-park user wishes.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A monitoring and directing system for a parking area having parking spaces, said parking area having at least one entrance and departure station provided for the issue and retrieval of parking tickets fitted with an electronic identification element, said system having communicators adapted to detect said parking tickets, there being arranged, at each parking space, at least one communicator which has a detection region directed towards the associated parking space, said system having data lines via which said communicators and said entrance and departure stations are connected to a central computer.

2. The monitoring and directing system of claim 1 in which said communicators each comprise a read head including an aerial which is tuned to a transmitting device or transmitting/receiving device integrated in said parking tickets.

3. The monitoring and directing system of claim 2 in which said communicators communicate with said central computer via an evaluation unit, said evaluation unit preparing information and controlling data transmission.

4. The monitoring and directing system of claim 1 including an alarm indicator connected to and which can be triggered by said communicators.

5. The monitoring and directing system of claim 1 in which said communicators are each installed at a parking space such that their respective response region covers the parking space.

6. The monitoring and directing system claim 1 in which said communicators are each installed at a parking space such that said parking tickets can be moved into the near region thereof, and the detection region of the communicator is located only within said near region.

7. The monitoring and directing system of claim 1 in which, for monitoring departure, said departure station is assigned a communicator whose response region is located in front of said departure station, or at said departure station, and is connected to said central computer via a data line.

8. The monitoring and directing system of claim 1 which further comprises visible signal device as indicating devices for car-park users.

9. The monitoring and directing system of claim 1 in which a sensor for detecting the free or occupied state is installed at each parking space, and said sensors are connected to said central computer via data lines.

10. A method of monitoring the parking procedure in a parking area having a plurality of parking spaces, said method comprising the steps of:

issuing a parking ticket to user on entrance into a parking area, machine reading in a contactless manner an individual identification number from said ticket, and transmitting the entrance time, under the individual identification number which has been read, to a computer, and/or storing the entrance time in the parking ticket;

re-reading the individual identification number of the issued parking ticket upon parking in a selected parking space and transmitting said individual identification number, which has been read, together with a parking-space number of the selected parking space to said computer;

re-reading said individual identification number of said parking ticket, which the car-park user took, upon collection of the vehicle, and transmitting said individual identification number, which has been read, together with the parking-space number of the located parking space;

comparing said individual identification numbers which have been read for a parking space upon parking and upon collection, and actuating a device which obstructs departure when a non-correspondence of the numbers is detected.

* * * * *